(12) United States Patent
Gaudette

(10) Patent No.: US 6,981,225 B1
(45) Date of Patent: Dec. 27, 2005

(54) INDICATING THE DIFFERENCES BETWEEN INTERNET WEB PAGES

(75) Inventor: Arthur L. Gaudette, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/494,801

(22) Filed: Jan. 31, 2000

(51) Int. Cl.$^7$ .............................................. G06F 3/00
(52) U.S. Cl. ..................................... 715/764; 715/760
(58) Field of Search ............................... 345/708, 745, 345/764, 776, 816, 840, 811; 715/744–747, 715/760, 764, 765, 808–811, 835

(56) References Cited

U.S. PATENT DOCUMENTS

| | | | |
|---|---|---|---|
| 5,142,619 A * | 8/1992 | Webster, III ................. | 345/784 |
| 5,806,073 A * | 9/1998 | Piaton ......................... | 707/200 |
| 5,978,828 A * | 11/1999 | Greer et al. ................. | 709/224 |
| 5,978,842 A * | 11/1999 | Noble et al. ................. | 709/218 |
| 6,012,087 A * | 1/2000 | Freivald et al. ............. | 709/218 |
| 6,029,175 A * | 2/2000 | Chow et al. ............. | 707/104.1 |
| 6,065,044 A * | 5/2000 | Ogasawara ................. | 709/207 |
| 6,219,818 B1 * | 4/2001 | Freivald et al. ............. | 714/799 |
| 6,240,409 B1 * | 5/2001 | Aiken ......................... | 707/101 |
| 6,272,531 B1 * | 8/2001 | Shrader ...................... | 709/206 |
| 6,324,555 B1 * | 11/2001 | Sites ........................... | 715/517 |
| 6,366,933 B1 * | 4/2002 | Ball et al. .................... | 707/511 |
| 6,560,620 B1 * | 5/2003 | Ching ........................ | 715/511 |
| 6,578,073 B1 * | 6/2003 | Starnes et al. .............. | 709/219 |
| 6,633,910 B1 * | 10/2003 | Rajan et al. ................. | 709/224 |
| 6,658,626 B1 * | 12/2003 | Aiken ......................... | 715/526 |
| 6,785,864 B1 * | 8/2004 | Te et al. .................. | 715/501.1 |
| 6,834,306 B1 * | 12/2004 | Tsimelzon .................. | 709/228 |

OTHER PUBLICATIONS

Web Publisher User's Guide. Netscape. May 1997.*
Comparing and Merging Files. MacKenzie, David; Eggert, Paul; Stallman, Richard. Sep. 1993.*
The AT&T Internet Difference Engine: Tracking and Viewing Change on the Web. Douglis et al. Jan., 1998.*
WebGUIDE: Querying and Navigating Change in Web Repositories. Douglis et al. 1994.*
Tracking and Viewing Changes on the Web. Douglis et al. 1996.*
Araxis PMdiff 4.5. http://web.archive.org/web/19980112143016/http://www.araxis.com/ 1998.*

\* cited by examiner

*Primary Examiner*—John Cabeca
*Assistant Examiner*—Brian J. Detwiler
(74) *Attorney, Agent, or Firm*—Trop, Pruner & Hu, P.C.

(57) ABSTRACT

Software may be provided for indicating the difference between an earlier cached version and a current version of a web page. This saves the user the trouble of comparing the two pages to determine whether there are changes that would be of interest. For example, in one embodiment of the present invention, the navigation bar of a web browser may include a button to allow the user to select a subtract or differencing feature. Once selected, the current version of a display web page is compared to a cached version of the web page and any differences are either highlighted or displayed.

17 Claims, 6 Drawing Sheets

Experience the next generation of Web sites and tools.

intel WebOutfitter
Service

*FIG. 3*

INDICATING THE DIFFERENCES BETWEEN INTERNET WEB PAGES

BACKGROUND

This invention relates generally to Internet browsers.

Internet browser software generally provides a window which enables the user to provide input commands for viewing Internet web pages. A number of users use a bookmark or favorite system to link quickly to web pages of interest. Thus, the user may repeatedly return to a given web page to determine whether new information is available. Sometimes web pages indicate new information by highlighting or otherwise pointing to information which is changed.

However, in many cases, the user is forced to scan through one or more pages at a given web site to determine whether there is any new information which may be of interest to the user. This can be a time consuming and laborious job.

Thus, there is a need for a simpler way to determine the differences between web pages over time.

SUMMARY

In accordance with one aspect, a method includes causing a processor-based system to difference a cached and current version of an Internet web page. The difference between the cached and current versions is then indicated.

Other aspects are set forth in the accompanying detailed description and claims.

BRIEF DESCRIPTION OF THE DRAWINGS

FIG. 1 is a depiction of an exemplary web page;

FIG. 2 is a later version of the exemplary web page shown in FIG. 1;

FIG. 3 is a depiction of a web browser display achieved by differencing the pages shown in FIGS. 1 and 2;

DETAILED DESCRIPTION

In accordance with one embodiment of the present invention, a web browser may include software to enable the differencing or subtraction of a cached web page from a currently available web page. Using the differencing functionality, one can determine what new features have been added to a given web page. This avoids the need to carefully scrutinize the new page and to manually compare it to the cached version of the web page.

For example, in one embodiment of the present invention, at the click of a mouse button, one can determine what are the differences between the old and new versions. The viewer can then examine only the changes to find the new information.

Figure 1:
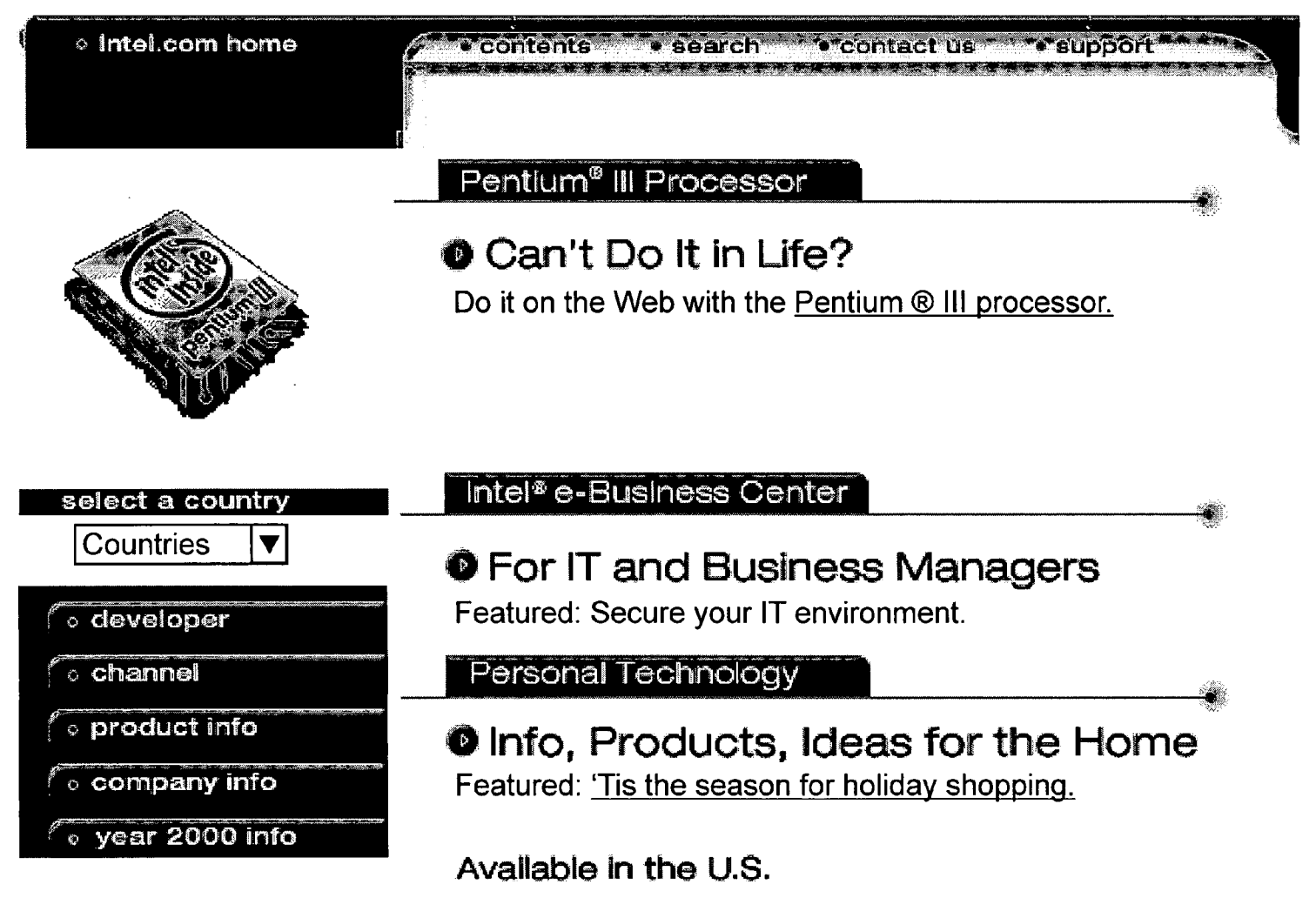
Figure 2:
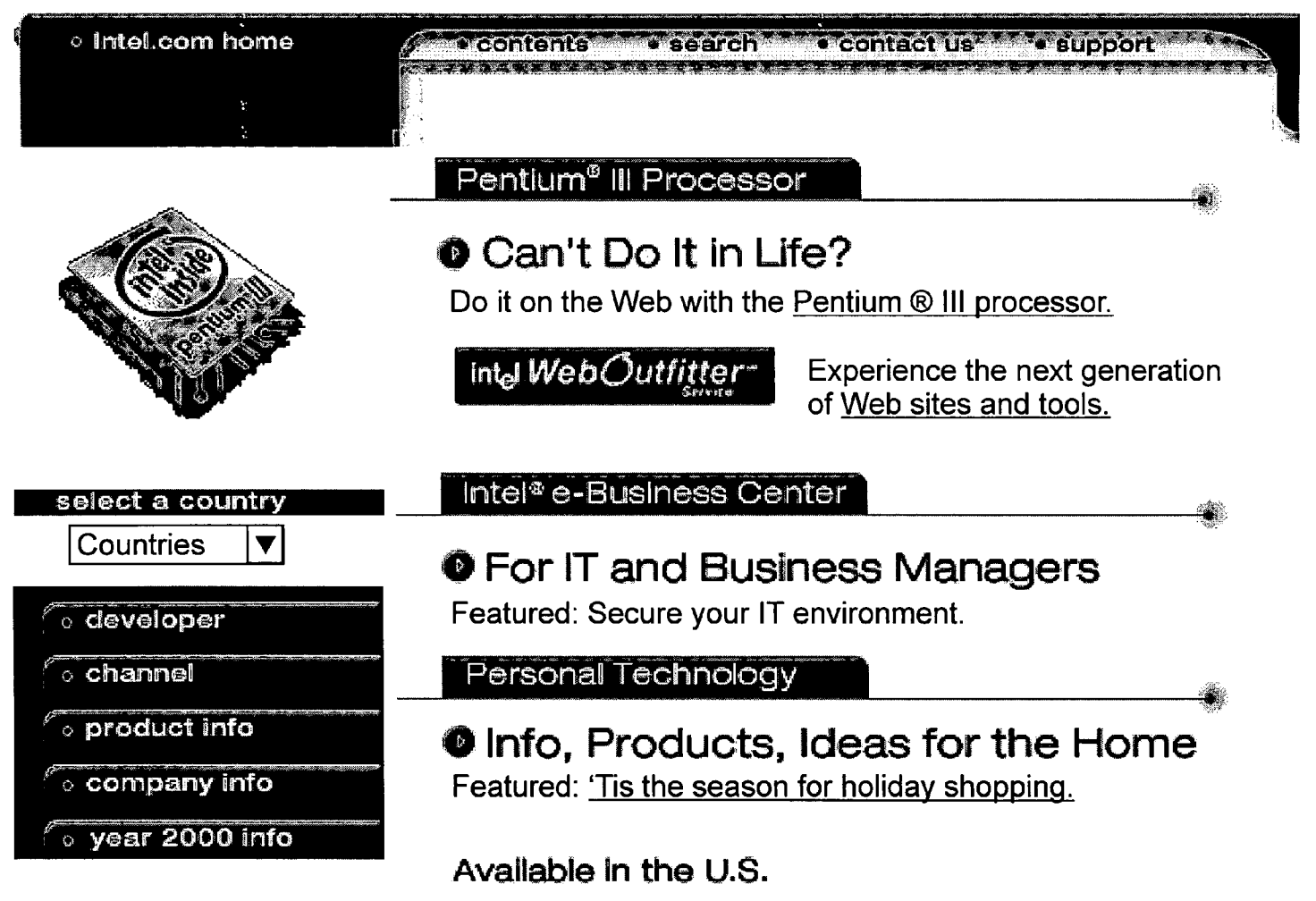
Figure 6:
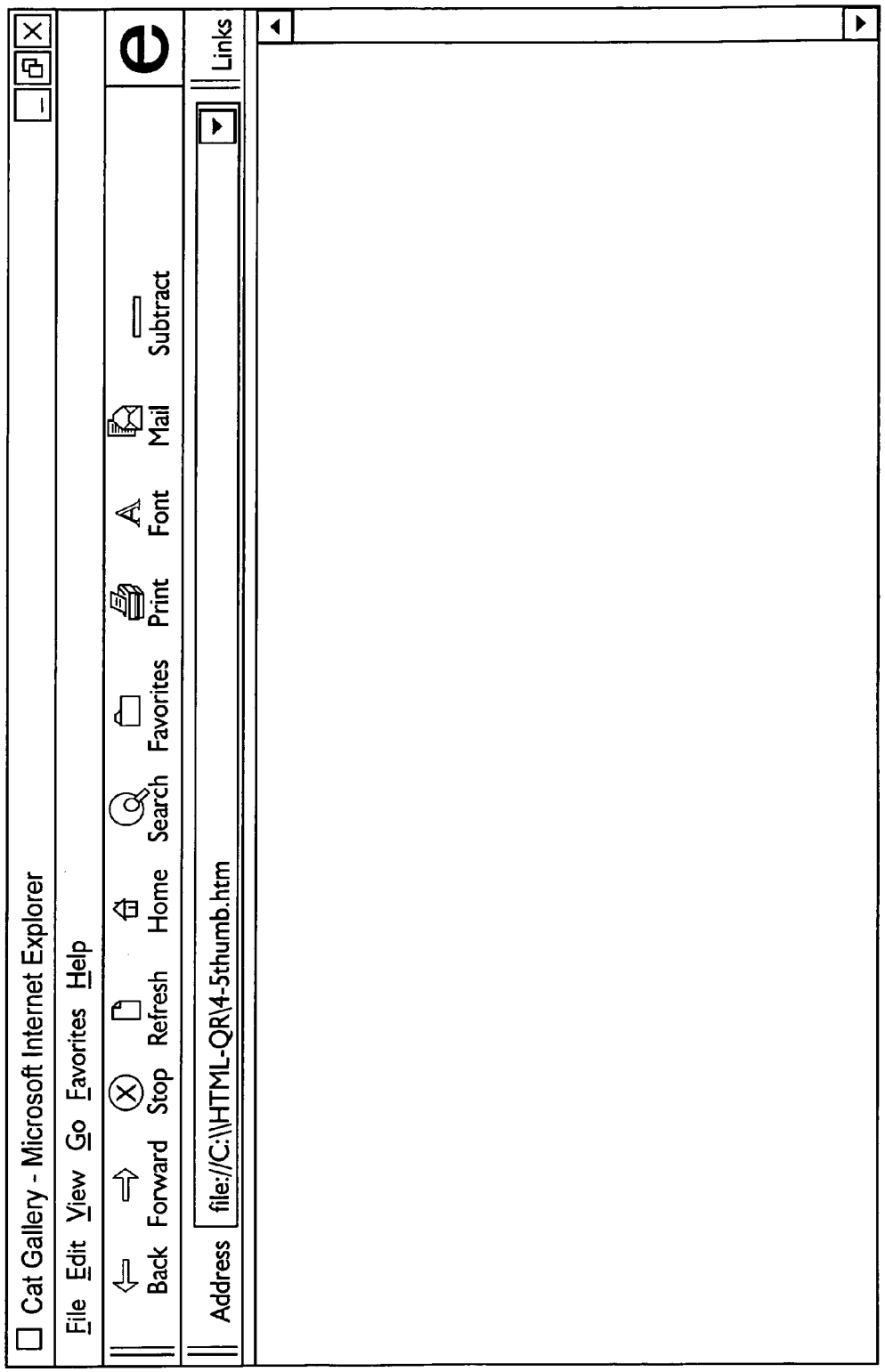
FIG. 6 is a view of a web browser navigation bar in accordance with one embodiment of the present invention.

Referring to FIG. 1, an earlier version of an exemplary web page is illustrated. This page may be cached by the web browser. FIG. 2 illustrates a later version of the same web page. Referring to FIG. 6, a browser navigation bar may include an icon labeled "subtract". When the user selects the subtract icon on the browser window navigation bar, the cached web page, illustrated in FIG. 1, may be differenced or subtracted from a current web page indicated in FIG. 2. The result is the difference between the cached and current web pages. The differences may be displayed as indicated in FIG. 3.

Thus, in one embodiment of the present invention, when the user operates the navigation bar subtract icon, the cached version of a web page and the currently displayed version are automatically subtracted. As a result, only the new material contained in the current version is displayed, as illustrated in FIG. 3.

Figure 4:
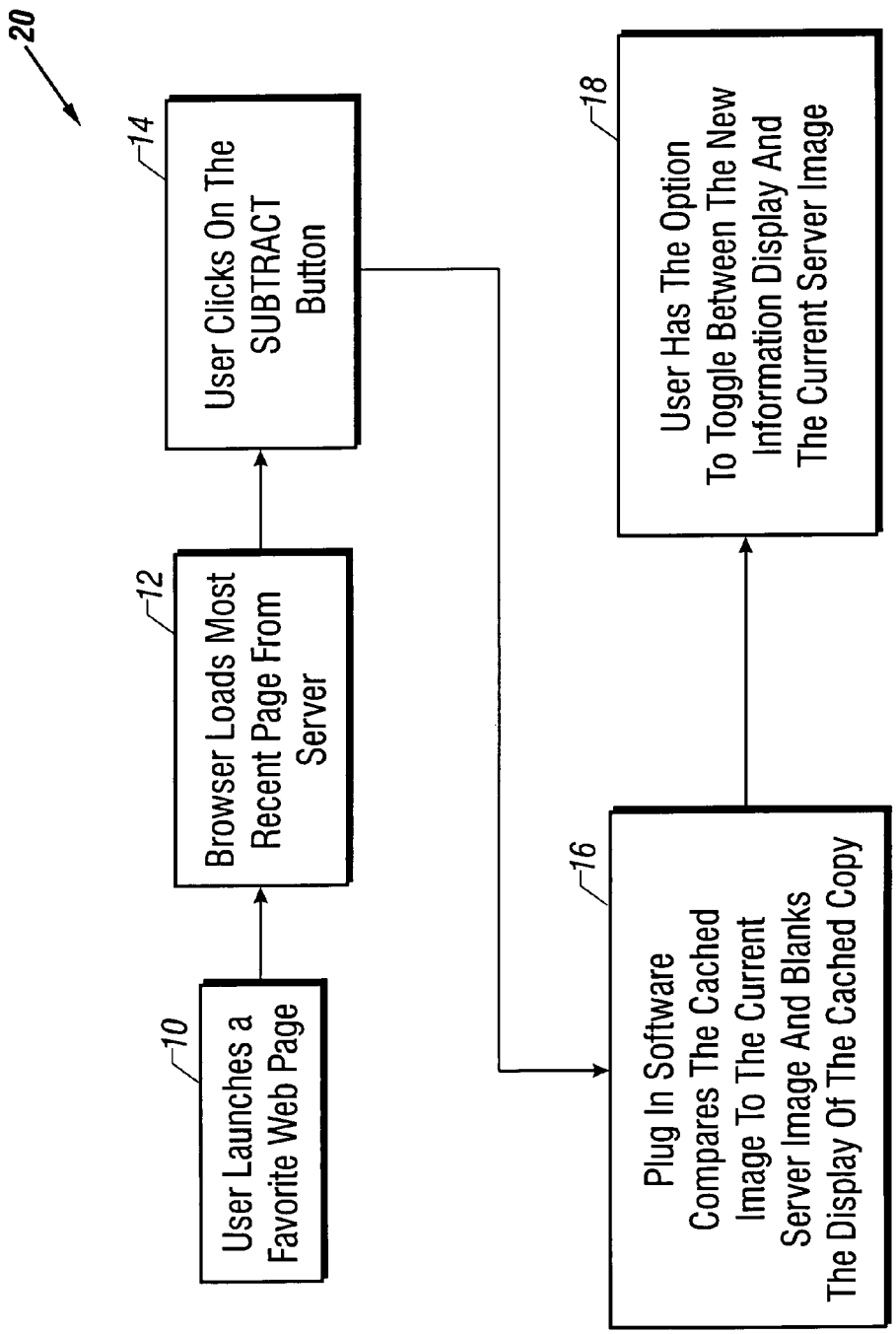
FIG. 4 is a flow chart for software for implementing one embodiment of the present invention.

Referring to FIG. 4, the user initially launches a current web page as indicated in block 10. The browser then loads the current page from the web server as indicated in block 12. When the user mouse clicks on the subtract icon as indicated in block 14, the software compares the cached image for that web page to the current server image in one embodiment of the present invention. A display with the repeated information blanked may show only the new information, as indicated in block 16.

In one embodiment of the present invention, the software may be provided as a plug-in to an existing browser. In another embodiment of the present invention, the browser software may be originally provided with the subtract or differencing functionality.

With the subtract functionality, the user then has the option to toggle between a display which shows only the new information, such as FIG. 3, and the current web page (block 18, FIG. 4). This toggling may be implemented for is example by repeatedly mouse clicking on the subtract icon on a navigation bar, for example. Selecting the subtract icon the first time may display the difference image. Selecting the icon again returns the display to the current server image.

Figure 5:
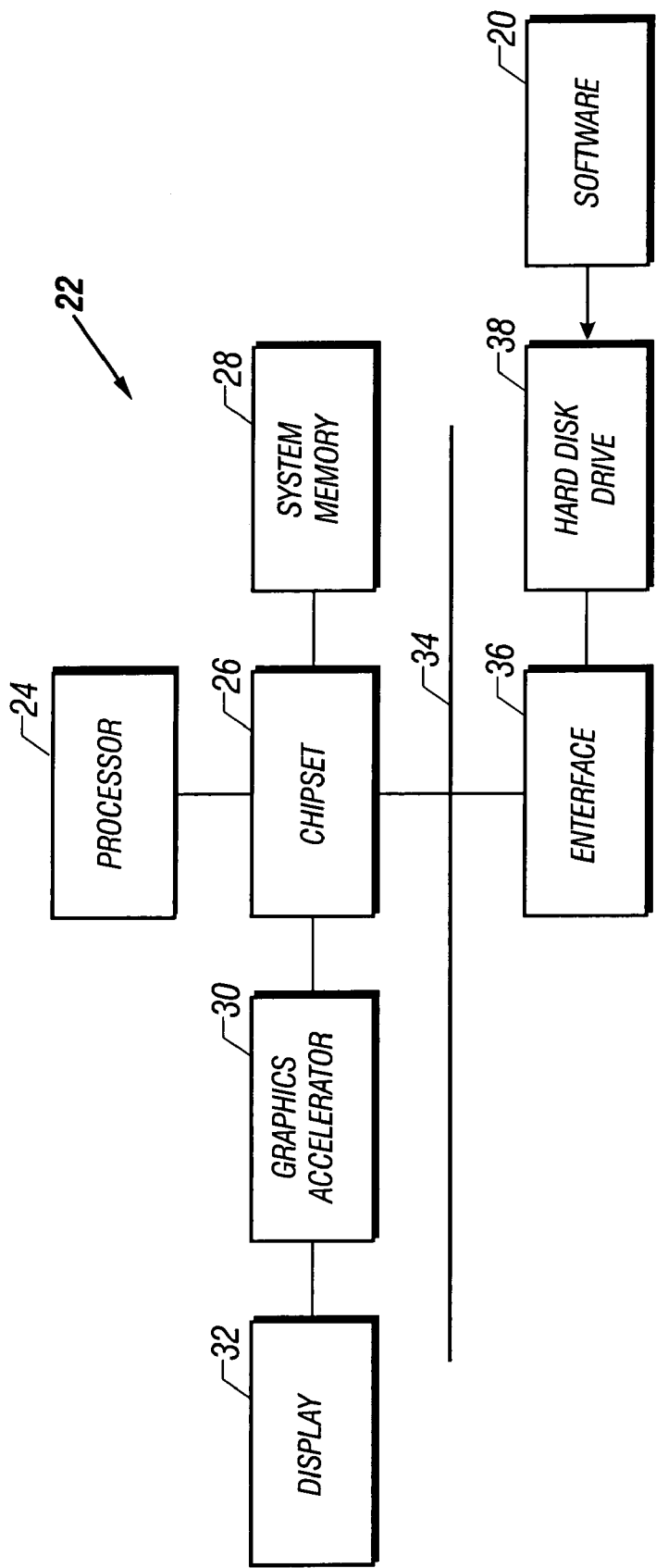
FIG. 5 is a block diagram of a processor-based system in accordance with one embodiment of the present invention.

Referring to FIG. 5, a processor-based system 22 includes a processor 24 coupled to a chipset 26 in one embodiment of the present invention. The chipset 26 may couple a system memory 28, a graphics accelerator 30 and a display 32. In addition, the chipset 26 may be coupled to a bus 34 in turn coupled to an interface 36 which may be part of a chipset. The interface 36 in turn couples a hard disk drive 38 which may store the software 20. The software 20 may, in one embodiment of the present invention, be an embodiment of a web browser or may be plug in software which operates with an existing web browser.

Comparison software is commercially available. For example, the Netscape Web Publisher compares different versions of a file. The output is a hypertext mark up language (HTML) file displayed in a web browser window that highlights where the versions differ.

Instead of merely displaying only the new material, the new material may be displayed in a highlighted fashion. For example, new material may be underlined or may be displayed in different color so that the viewer can see the new material on the display of the current web page.

In still another alternative, instead of responding to the user's selection of an icon, the system may automatically provide an indication of the differences between the two web pages. For example, in one embodiment of the present invention, the current web page is initially, automatically displayed with highlighting, indicating the new material added to the cached web page. This avoids the need for the user to select the differencing functionality and still allows uninterrupted viewing of the current version of the web page.

In still another embodiment of the present invention, instead of displaying only the new material, in one embodiment of the present invention, the new material may be displayed in one way and any deleted material may be displayed in another way. For example, in one embodiment of the present invention, new material may be indicated in one color and deleted material may be indicated in a different color.

As yet another embodiment of the present invention, the differencing software may determine whether there are different links provided in a new version of the web page. Thus, the new links, indicated by uniform resource locators, may be identified separately from other changes in response to a user inquiry. As still another alternative, any new links may be highlighted in a special way, such as by a distinct color.

As still another embodiment of the present invention, in connection with web pages which provide chat or feedback information, any new feedback responses, which have been received since the last time the responses were checked by a user, may be highlighted or otherwise indicated. For example, in connection with stock comment pages, users may provide a running commentary of chat responses or messages on a given topic about a given stock. Instead of requiring the user to remember the user's last viewed response in the series of responses, a differencing mechanism may be utilized to determine the difference between the information last contained on the page and the information now on the page. Instead of displaying all of the information, the user may be provided with a list of only those new comments received after the user last checked the page.

If desired, the software 20 may also automatically or selectively cache each viewed page. This may ensure that a given page is available for subsequent comparison.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer accessible medium storing instructions to:
   provide a graphical user interface for a browser application for a display of a processor-based system, said interface including a navigation bar with a selectable subtract button image and a window to display a web page;
   in response to an initial selection of said subtract button image, causing said browser application to difference a cached version and a current version of a Web page and display the difference between said versions in said window; and
   in response to subsequent selection of said subtract button image, toggle between the display of said current version and the display of the difference between said versions in said window.

2. The computer accessible medium of claim 1 further storing instructions to blank the common material between the cached and current versions.

3. The computer accessible medium of claim 1 further storing instructions to difference the cached version and the current version when the subtract button image is mouse clicked on.

4. The computer accessible medium of claim 1 further storing instructions to selectively cache a viewed page.

5. The computer accessible medium of claim 1 further storing instructions to receive a web page including feedback information and indicate a new feedback response.

6. The computer accessible medium of claim 5 further storing instructions to display new feedback responses only.

7. A system comprising:
   a processor;
   a display coupled to said processor;
   a storage coupled to said processor; and
   said storage storing instructions for a browser application that enable the processor-based system to provide a graphical user interface for the display, said interface including a navigation bar with a selectable subtract button image and a window to display a web page, in response to an initial selection of said subtract button image, causing said browser application to difference a cached version and a current version of a web page and display the difference between said versions in said window, and in response to subsequent selections of said subtract button image, toggle between the display of said current version and the display of the difference between said versions in said window.

8. The system of claim 7 wherein said storage stores instructions that enable the processor to selectively cache a viewed page.

9. The system of claim 7 wherein said storage stores instructions that enable the processor to receive a web page including feedback information and indicate a new feedback response.

10. The system of claim 9 wherein said storage stores instructions that enable the processor to display new feedback responses only.

11. The system of claim 7 wherein said storage stores instructions that enable the processor to determine if new links are provided in said current version of said web page and identify the new links separately from any other difference between said versions.

12. The system of claim 7 wherein said storage stores instructions that enable the processor to load said current version from a web server for the web page.

13. The system of claim 7 wherein said storage stores instructions that enable the processor to display a newly received current version in said window and automatically highlight new material added to the cached web page.

14. A method comprising:
   upon initial receipt of a current version of an Internet web page by a browser application, said browser application automatically comparing the current version and a cached version of the page and displaying, in a window of said browser application, an indication of the difference between said versions; and
   toggling between displaying the indication of the difference and displaying said current version of said page in said window, said toggling in response to user selection of a selectable subtract button image on a graphical user interface of a navigation bar within said browser application.

15. The method of claim 14 wherein displaying an indication of the difference includes blanking the material common to said current and cached versions.

16. The method of claim 14 including retrieving said current version in response to user selection of an indicator on a list saved in a browser.

17. The method of claim 14 including selectively caching a displayed page.

* * * * *